June 4, 1968  R. I. LEACH ETAL  3,386,174
COORDINATE MEASURING MACHINE

Filed July 1, 1965  5 Sheets-Sheet 1

INVENTOR.
JOHN H. LANABAN
ROBERT I LEACH
BY
William S. Thompson

June 4, 1968     R. I. LEACH ETAL     3,386,174
COORDINATE MEASURING MACHINE
Filed July 1, 1965     5 Sheets-Sheet 2

INVENTOR.
JOHN H LANABAN
ROBERT I LEACH
BY
W. S. Thompson

INVENTOR.
JOHN H LANABAN
ROBERT I LEACH
BY

June 4, 1968     R. I. LEACH ETAL     3,386,174
COORDINATE MEASURING MACHINE

Filed July 1, 1965     5 Sheets-Sheet 4

INVENTOR.
JOHN H LANABAN
ROBERT I LEACH
BY
W. S. Thompson

June 4, 1968          R. I. LEACH ETAL          3,386,174
COORDINATE MEASURING MACHINE

INVENTOR.
JOHN LANAHAN
ROBERT LEACH

United States Patent Office 3,386,174
Patented June 4, 1968

3,386,174
COORDINATE MEASURING MACHINE
Robert I. Leach, Clinton, and John H. Lanahan, Whitesboro, N.Y., assignors to The Bendix Corporation, Utica, N.Y., a corporation of Delaware
Filed July 1, 1965, Ser. No. 468,736
6 Claims. (Cl. 33—174)

ABSTRACT OF THE DISCLOSURE

A mechanical coordinate measuring machine having a first frame rigidly attached to a work support means and composed of a pair of parallel members, one of which is tubular and the other of which is an elongated rectangular rail. This frame supports a second frame, movable thereon in a direction parallel to the first pair of rail members and composed of a similar pair of parallel members perpendicular to the first pair. The position of the second frame with respect to the first is controlled by a vernier positioning control using a pivoted gripping bracket which grips the rail of the first frame and pivots to precisely position the second frame. The second frame similarly supports a probe holder which is, in turn, free to move thereon in a second direction which is perpendicular to the direction in which the second frame is free to move and which includes a similar vernier positioning control.

---

The present invention relates to coordinate measuring machines for measurement and layout of castings, machined parts, sheets metal parts, tools, dies, printed circuits and other similar applications.

The probe and probe holding devices disclosed in copending, commonly-assigned patent application Ser. No. 468,903, filed concurrently with the present application in the names of John Lanahan and Robert Leach and entitled, "Probes and Probe Holding Devices for Coordinate Measuring Machines," may be used in conjunction with the present application. The ornamental design for a coordinate measuring machine disclosed in copending, commonly-assigned patent application Ser. No. D. 86,021, now U.S. Design Patent D. 207,026, filed concurrently with the present application in the names of Robert Leach and John Lanahan and entitled, "Internal Locating Probe for a Coordinate Measuring Machine," may also be used in conjunction with the present invention.

Coordinate measuring machines are designed and constructed to achieve a high degree of precision. Prior art devices have achieved the precision sought at the expense of reliability, durability and high manufacturing cost. The present invention achieves the same high degree of precision of coordinate measuring machines costing two to three times as much to manufacture. Such reduced costs are achieved by the novel structure and function to be described in detail. The present invention eliminates much of the highly expensive and time-consuming machining of parts formerly believed necessary to make accurate coordinate measuring machines. The present invention employs temperature self-compensating parts so that adjustments need not be made for ambient temperature changes and so that the usable ambient temperature range of the machine is increased. The present invention, by employing mechanical parts for all essential machine functions, is more durable, reliable and trouble-free than prior art machines using electrical circuitry. In addition, the present machine may be used in work areas where electrical power is unavailable or dangerous to use.

It is an object of the present invention to provide a precision mechanical coordinate measuring machine at a much lower cost than comparable prior art machines.

It is an object of the present invention to provide a precision coordinate measuring machine which is more rugged and durable than comparable prior art machines.

It is an object of the present invention to provide a coordinate measuring machine which has a much wider range of permissible ambient temperatures than prior art machines and which is automatically temperature self-compensating.

It is an object of the present invention to provide a coordinate measuring machine which can be hand-operated quickly, easily and precisely.

It is an object of the present invention to provide a coordinate measuring machine which requires virtually no maintenance.

It is an object of the present invention to provide a coordinate measure machine which has no error-inducing stressed or deformed frames.

It is an object of the present invention to provide a coordinate measuring machine which has a torque and compression resistant frame.

It is an object of the present invention to provide a coordinate measuring machine which is resistant to dirt, dust, metal chips, bumps, jolts and other hazards concomitant with normal industrial use.

It is a further object of the present invention to provide a mechanical coordinate measuring machine which can be adjusted simply and easily on location.

It is a further object of the present invention to provide a coordinate measuring machine which has low hysteresis and corresponding high repeatability of readings.

It is a still further object of the present invention to provide carriage mountings which employ both fixed and movable bearings for support, alignment and abuse absorbing purposes.

It is a still further object of the present invention to provide carriage mountings which cause no error-inducing bending moments or other torsional stresses.

It is a still further object of the present invention to provide carriage mountings which are lightweight, easy to position and resistant to damage from foreign matter.

It is a still further object of the present invention to provide a novel vernier position adjustment for a coordinate measuring machine which is positive in operation, easy to operate and impervious to hard use.

It is a still further object of the present invention to use a novel support structure which employs straps or gussets for mounting and aligning of the coordinate measuring machine support members.

It is a still further object of the present invention to use a single pin construction for mounting and aligning the coordinate measuring machine support members.

Other objects and advantages of the present invention will be apparent from the following description taken in conjunction with the accompanying drawings of an embodiment of the present invention in which.

Figure 1:
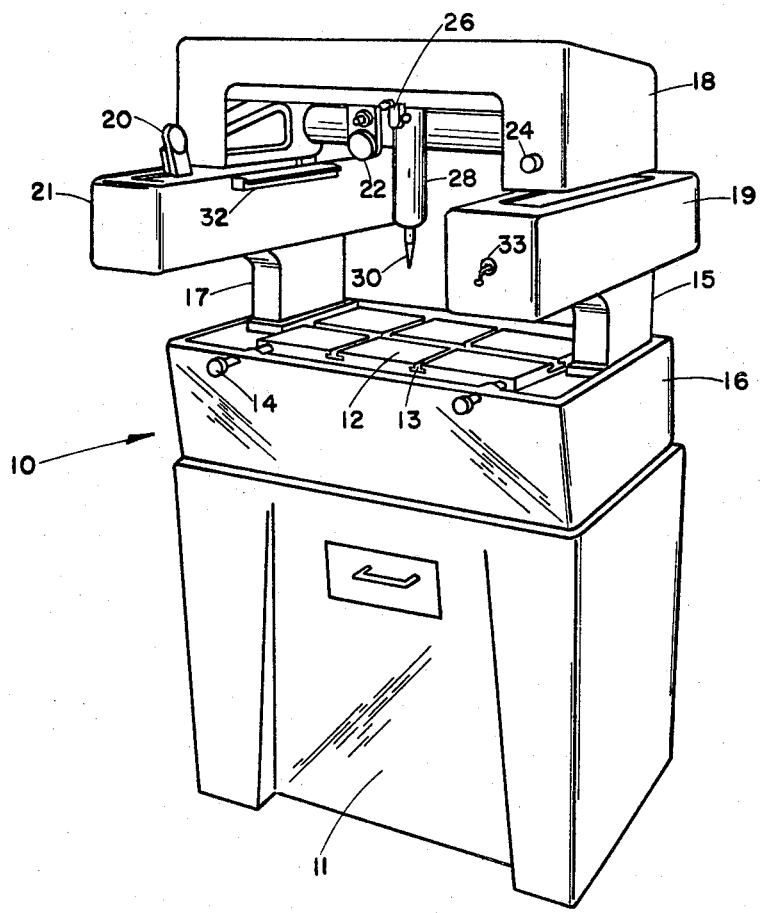
FIGURE 1 shows a front perspective of a coordinate measuring machine in its ready for use state.

Turning now to FIGURE 1, a coordinate measuring machine shown generally by the numeral 10 is supported on a stand 11. A work table support 16 has a work table 12 mounted in a boss (not shown) in the support 16. Such a mounting permits the work table 12 to be rotated by the controls 14. The work table 12 is rotated to the left by turning the left control (as shown in FIGURE 1) counterclockwise and the right control (as shown in FIGURE 1) clockwise. Reverse rotation of the controls reverses the rotation of the work table 12 in the boss. The work table 12 is shown having slots or channels 13; however, tapped or threaded holes could also be employed. Supported above the work table support 16, on support arms 15 and 17, are the two movable carriages which are behind dust covers 19, 21 and 18. Riding with each carriage is a measuring device 20 and 22. Also shown generally in FIGURE 1, are the vernier positioning adjustments 24 and 26 and the probe holder 28 and probe 30. A light 32 and a switch 33 to control it are provided to illuminate the work table 12.

Figure 2:
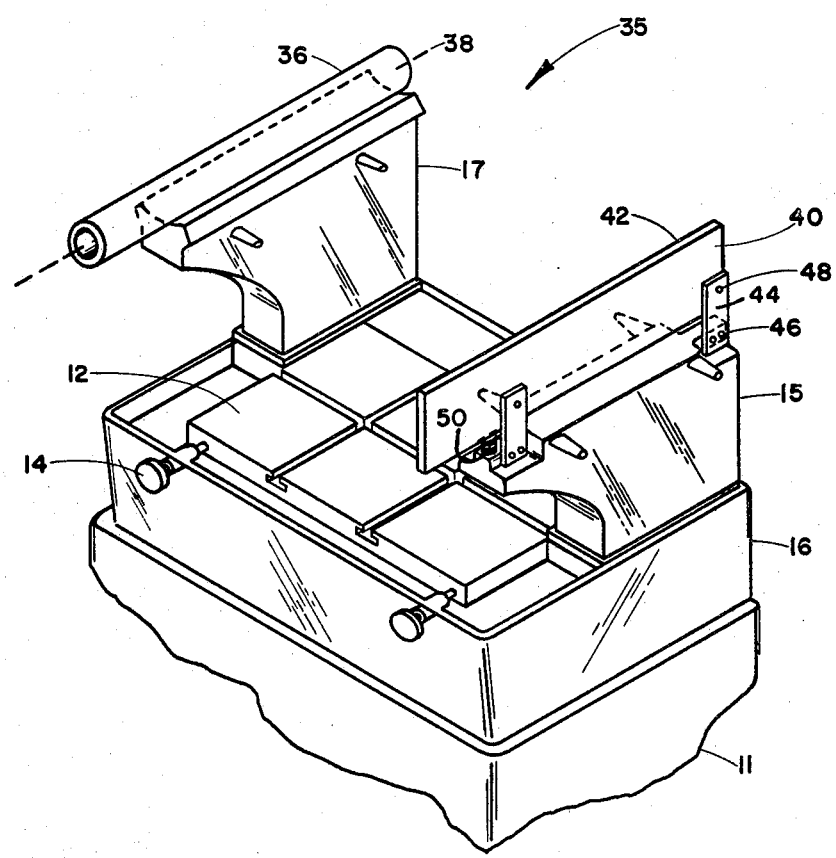
FIGURE 2 shows a front isometric view of a portion of a coordinate measuring machine showing the work table, a support frame called the "Y-axis support" being a portion of FIGURE 1.

Turning now to a more detailed description of the present invention, in FIGURE 2 is shown a support or frame structure indicated generally by the numeral 35 known as the Y-carriage support. Fixedly connected to support arm 17 is a first hollow tubular or cylindrical member 36 having an axis 38. A first rail or plate member 40 having a side 42 is fastened by a plurality of strap members or gusset members 44 to the support arm 15. One end of the gussets 44 is connected to the support arm 15 by rivets or bolts 46 or other convenient means. The other end of gusset plates 44 is connected to rail member 40 by a single bolt, pin or rivet 48 or other suitable connecting device. The connecting device 48 is loosely fitted into the rail 40 until the rail is aligned relative to the work surface 12 such that the top side 42 of rail 40 is aligned parallel to the work surface 12. A final alignment check is then made if the rail 40 is not aligned as desired, adjustment screw 50 fitted into the support arm 15 to make such final adjustment as may be necessary. The rail 40 is then firmly connected to the gusset plates 44 in the aligned position. The tubular member 36 or tubular member axis 38 is then aligned parallel to the rail or plate 40 by devices to be later described. A multiple pin connection may be used instead of the single pin connection, providing sufficient room is allowed in the pin holes in either the rail member 40 or the gusset members 44 or both to align the rail member; i.e. permit a limited degree of rotation of rail 40 about pin (or pins) 48. The single pin connection permits the unstressed alignment and the flexible straps or gussets permit impact loads to be absorbed without disturbing the machine alignment. The gussets 44 have slight flexibility in the direction parallel to the pins 48 but are otherwise very rigid. It can be readily appreciated that this construction arrangement provides a rigid assembly in the direction absolutely necessary and permits some flexibility or movement in a direction where it will not disturb measurement accuracy.

Figure 3:
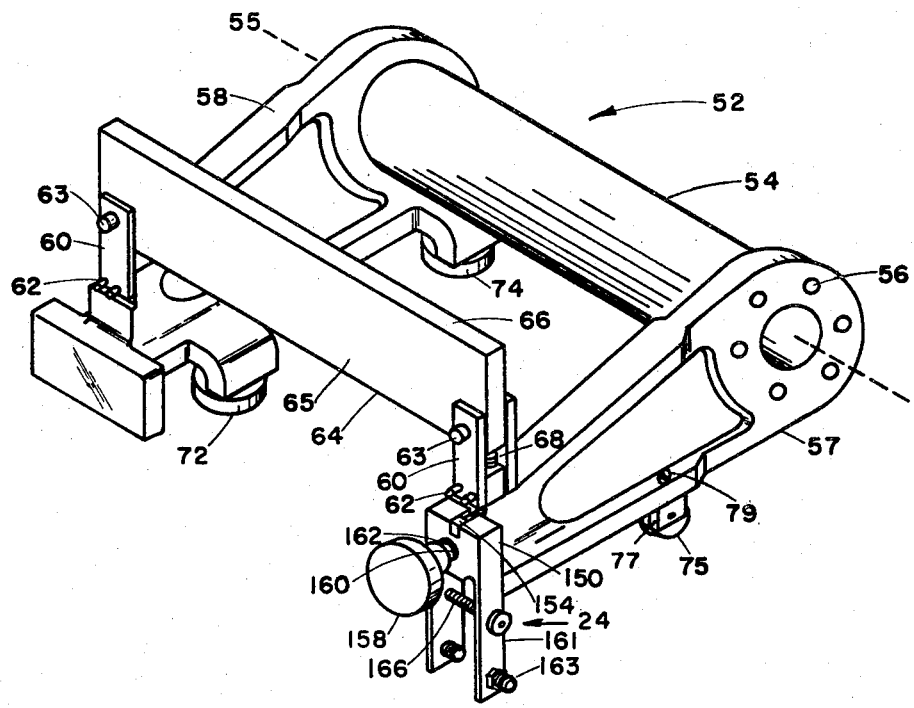
FIGURE 3 is a front isometric elevational view of a movable support and carriage called the Y-carriage showing the torsion and compression-resistant frame.

In FIGURE 3, a movable second frame or support structure called the Y-carriage, having a quadrilateral frame, is generally shown by the numeral 52. The Y-carriage has a torque resistant tubular or cylindrical member 54 having an axis 55 which has its transverse ends connected by bolts 56 to support arms or members 57 and 58. A plurality of second straps or gusset plates 60 are fixedly connected to the support arms 57 and 58 by bolts or rivets 62. A second rail or plate member 64 having a flat side 66 is connected on both faces 65 and 67 to the straps or gusset plates 60 by a single pin or bolt 63 in each plate or gusset and aligned relative to the tubular member 54 or the axis 55. A final adjustment screw 68 is provided to make final alignment adjustments of the rail member 64. The bolts 63 or other connecting device are tightened into final position. A multiple pin connection may be used if sufficient room is allowed in the pin holes in either the rail member 64 or the gusset members 60 or both to align the rail member 64 relative to the tubular member 54.

The structure shown and described which forms the Y-carriage is not easily deformed by loading by virtue of the tubular member 54 and rail member 64. The straps or gusset members 60, by virtue of the single pin connection, permit the alignment of the rail member 64 relative to the cylindrical member 54 without distorting, stressing or otherwise preloading the rigid structure comprised of cylindrical member 54 and support arms 57 and 58. The strap members permit a limited flexibility in the Y direction parallel to the pin where it will not affect measurement accuracy.

Figure 4:
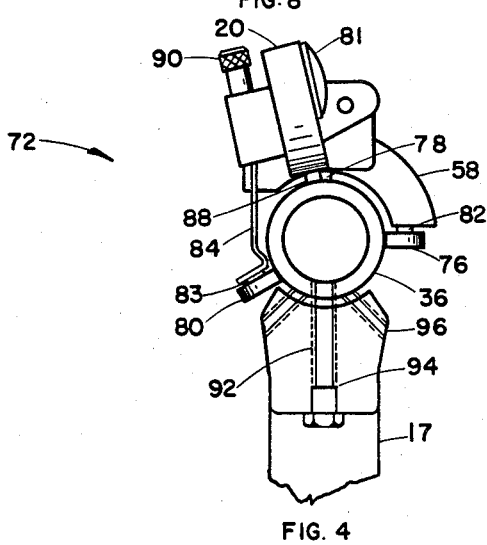
FIGURE 4 is an end view of a portion of the Y-axis support shown in FIGURE 2, a bearing arrangement of the movable carriage shown in FIGURE 3 for aligning and supporting the movable carriage.

The Y-carriage (second support frame) 52 is supported for movement on the first support frame 35 (cylindrical member 36 and first rail 40) by a tripodular bearing arrangement having first and second bearing clusters 72 and 74 connected to the support arm 58 and a third bearing device 75 connected to support arm 57. The first and second bearing clusters 72 and 74 are virtually identical. FIGURE 4 shows an axial view of the first tubular member 36 with the first bearing cluster 72 mounted thereon. Bearing cluster 72 consists of three bearings 76, 78 and 80 connected to the support arm 58 in a common plane and disposed circumferentially around the first cylindrical member 36. Bearing 76 is rotatably and adjustably mounted eccentrically on a shaft 82 to permit alignment of the Y-carriage relative to the first frame 35. Bearing 78 is rotatably mounted about a first pin (not shown) to the support arm 58. Bearing 80 is mounted on a spring member 84, typically metal. The spring member 84 is connected at one end to the support arm 58 and has a bearing 80 rotatably connected to shaft 83 which is fixedly connected to the other end of the spring member 84. The spring 84 forces its radially-movable bearing 80 against the tubular member 36 which causes the support arm 58 and the radially-fixed bearings 76 and 78 to be drawn firmly against the tubular member 36. Bearing cluster 74 has none of its bearings mounted on an adjustable eccentric shaft, but it is otherwise identical to bearing cluster 72. The combination of the radially-fixed and the radially-movable bearings of the first and second bearing clusters effectively locates the Y-carriage relative to the first frame 35. Bearing 75 is, however, connected to a housing 77 which has a swivel connection 79 (best shown in FIGURE 3) to the support arm 57. Bearing 75 may be fixedly connected to support arm 57 to support the Y-carriage on the first rail member 40. Bearings 76, 78 and 80 are so arranged in their common plane as to have an arc length coverage of tubular member 36 equal to or greater than 180°. By this arrangement, the radially-movable bearing 80 is able to exert a force to hold the Y-carriage on the first frame against the force of the measuring device 20 which has a spring loaded measuring wheel 88 which rides on tubular member 36. The measuring device 20 has a dial indicator 81 which permits the operator to read the travel measured by wheel 88. Adjustment control 90 permits control of the pressure exerted by the measuring wheel on the tubular member 36. The measuring device shown is merely an example of a measuring device which may be used in conjunction with the present invention.

Also shown in FIGURE 4 is the adjustment mechanism 92 which is used for aligning the first tubular member 36 relative to the rail 40. A bolt 94, threaded into the tubular member 36, adjustably interconnects the support member 17 and the tubular member 36. A plurality of set screws 96 are threaded through a portion of the support arm 17 to adjustably engage the tubular member to make corrections in the position of the tubular member. The bolt 94 and set screws 17 are arranged in a common plane so that no error-inducing bending moments are created.

The operational head mechanism or the X-carriage 100 (best shown in FIGURE 5 and not including the vernier control device 26) has a collar 102 which adjustably holds a probe holder 28 and probe 30. The collar 102 has a plurality of set screws, one of which is indicated by numeral 108, spaced axially and circumferentially around the collar 102. A control thumbscrew 110 is threaded into the collar 102 to force the collar against the set screws 108. In the present embodiment of the invention, four set screws 108 are employed. Set screw 108 is one of four such set screws arranged in two pairs spaced above and below the control thumbscrew 110 and each set screw is radially located 120° from the other set screw in the pair and 120° from the thumbscrew. An end view of the collar 102 would show the control thumbscrew 110 and 120° away on either side would be located a set screw 108 with the second pair lying behind the first pair. This is also shown in greater detail in co-pending, commonly-assigned application Ser. No. 468,903. Error-inducing forces and bending moments are thereby substantially eliminated. The collar 102 has a tripodular or three arm support structure 112, 114, and 116.

Figure 6:
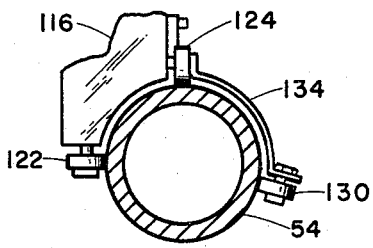
FIGURE 6 is an end view of the tubular support member shown in FIGURE 3 showing the operational head support mechanism bearing structure shown in FIGURE 5.

First and second bearing clusters 118 and 120 are mounted on the first and second arms 112 and 114. Each bearing cluster has two radially-fixed bearings 122, 124, 126 and 128 connected to its respective arm and a radially-movable bearing 130 and 132 connected to a spring member 134 and 136 which is in turn connected to its respective arm. As can be seen in FIGURE 6, which is an axial view of the Y-carriage tubular member 54, the two fixed bearings 122, 124 and the one radially-movable bearing 130 are mounted in a common plane about the tubular member. The bearing structure covers a total arc length of the tubular member equal to or greater than 180°, thereby holding the operational head support 100 on the tubular member 54 and the rail member 64. A third bearing 136 is connected to the third support arm 116 to support the operational head mechanism on the rail side 66 of the Y-carriage.

Figure 8:
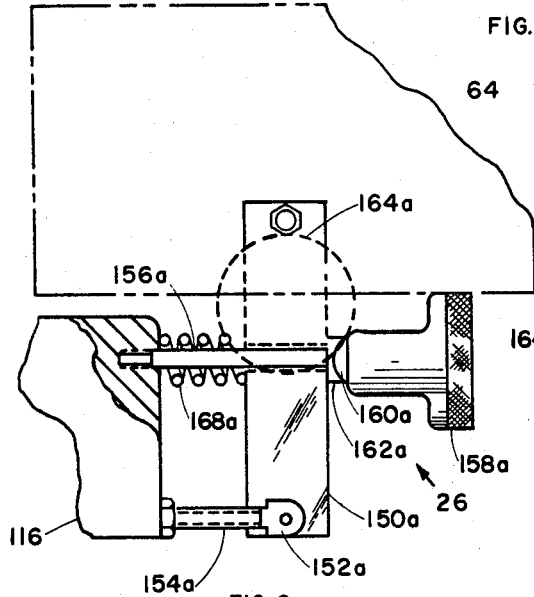
FIGURE 8 is a side view of the vernier positioning adjustment shown in FIGURE 7.
Figure 7:
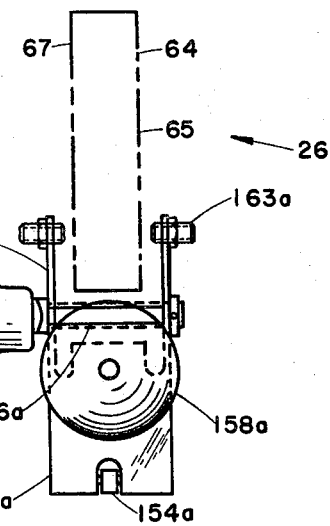
FIGURE 7 is a front view of the vernier positioning adjustment and a sectional view of a support rail.

Vernier or positioning adjustment control devices 26 (shown in FIGURES 5, 7 and 8) and 24 (shown in FIGURE 3) are virtually identical in operation and construction. Vernier control 26 is permanently and fixedly connected to the support arm 116 of the X-carriage 100. A flexible bracket or U-shaped member 150a is pivoted at one end by a pin 152a and first shaft 154a interconnecting the X-carriage 100 to the bracket 150a. A second shaft member 156a is connected on one end to the X-carriage assembly 100, support arm 116, and on the other end, threaded to a first control or drive knob or wheel 158a. A plurality of part-spherical washers 160a, 162a are disposed on the second shaft member 156a intermediate of the first control wheel 158a and bracket 150a. The second shaft is journalled loosely through its bracket member to permit its angular movement relative thereto. The spherical washers permit that relative motion which is partly an angularity change to be smooth and prohibits the control knob from binding with or damaging its associated bracket member. A plurality of gripping elements or screws 163a are connected to the bracket member arm 161a to hold the Y-carriage rail member. The gripping elements are controlled by a second control device having a second wheel 164a threaded on a third shaft 166a for opening and closing the bracket arms 161a. The third shaft is journalled through the bracket member and adapted to enable engagement of the bracket arms 161a by the second control wheel. The second control wheel, in combination with the gripping element and the third shaft and the bracket member, form a braking device or a holding device. In operation, the gripping elements hold the bracket fixed relative to the Y-carriage rail member with respect to translating motion, however, permit rotation of the bracket about screws 163a; the first control wheel is rotated to either advance or retreat on the second shaft member 156a relative to the X-carriage member. A spring 168a is disposed about the second shaft 156a to move the carriaeg rearwardly when the control knob retreats relative to the shaft and X-carriage. The spring member is operative to force the bracket member against the spherical washers and press the washers against the control wheel, thus biasing the carriage relative to the control wheel and eliminating any lost motion. Vernier or positioning control device 24 is virtually identical in operation and construction to vernier control device 26; therefore, parts in control 26 bear similar numbers to those in control 24, except that the parts in control 24 have the suffix *a* omitted from their numerals. Vernier control 24 is connected to the support arm 57 of the Y-carriage 52.

With the gripping devices relaxed, the operational head mechanism 100 is located in the approximate position. The gripping devices are then tightened by rotating the control knobs 164 and 164a which compress the bracket arms 161 and 161a, and the gripping elements are then brought into contact with the support and carriage rails 40 and 64. After tightening both of the gripping devices, the operational head mechanism 100 is stabilized and rotation of the control knobs 158 and 158a will cause a slight change in position; i.e. the vernier positioning function. This is accomplished by changing the orientation of the brackets 150 and 150a with respect to their pivotal pins 154 and 154a and the portion of the device to which the pivotal pins are connected. Pin 154 is connected to the support arm 54 and pin 154a is connected to the arm 116 of the operational head mechanism 100. Even though the bracket is gripping the rail, it should be obvious from FIGURE 8 that the bracket is free to rotate about the gripping point when the control knob 158a (or 158) is rotated, thus altering the distance between the bracket 150a (or 150) and the arm 116 (or 54). As the bracket pivots about the gripping elements, the carriage or operational head is moved due to the fixed distance connection of the pin 154a (or 150) and the variable distance connection provided by shaft 156a (or 156).

The first support frame and the Y-carriage each have therein a tubular member and rail member made of the same material to equalize temperature expansion and contraction. Similarly, the pairs of support arms 15, 17 and 57, 58 may each be made of the same material to eliminate temperature expansion problems.

In order to avoid expensive machining of the tubular or cylindrical axis or frame support members, a system of tensioning rods or other well-known straightening device may be used.

It can easily be seen that the present invention achieves its stated objects of low cost, high accuracy and high durability.

Figure 5:
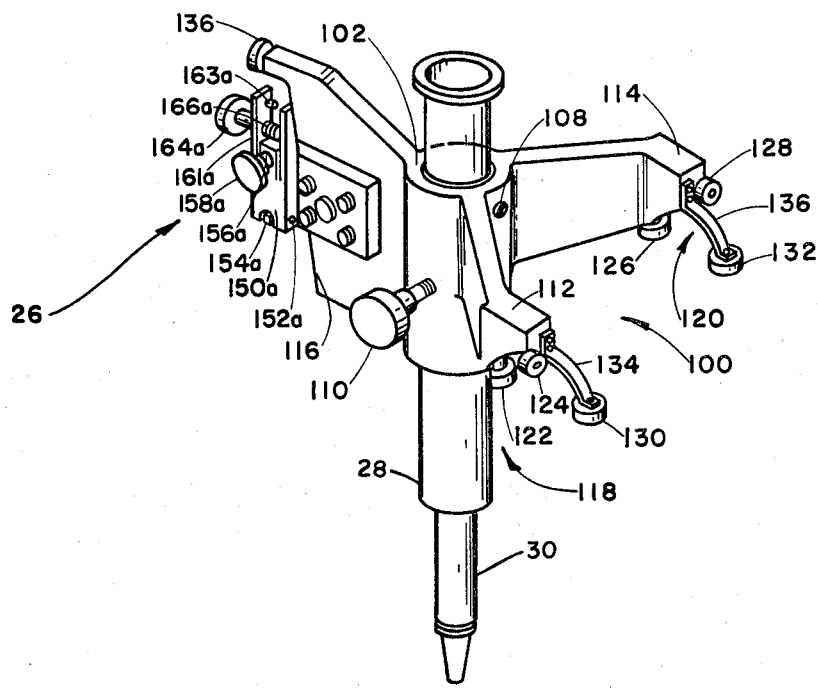
FIGURE 5 is a side elevational isometric view of the operational head support mechanism known as the X-carriage showing the tripodular bearing support structure.

In finally-assembled configuration, the Y-carriage (shown in FIGURE 3) rides on its bearings (shown in part in detail in FIGURE 4) on the first support frame 35 shown in FIGURE 2. Thus, the first and second bearing clusters 72 and 74 are supported on the first cylindrical tube 36 and the swivel mounting bearing 75 is supported on the side 42 of the first rail member 40. In a similar manner, the X-carriage first and second bearing clusters 118 and 120 are supported on the Y-carriage 54 and the operational head fixed bearing 136 is supported on the top side 66 of the second axis rail member. In effect, the operational head, shown in FIGURE 5, is rotated 90° in a counterclockwise direction and placed upon the Y-carriage 52, shown in FIGURE 3. A multi-story or stage structure is assembled on the base or stand 11. The support frame structure 35 is supported by the base 11. The Y-carriage is supported on the support frame structure 35 and the X-carriage or operational head support 100 is carried by the Y-carriage. The covers 19 and 21 cover the first rail member 40 and first tubular member 36 respectively. The top cover 18 encloses the Y-carriage 52 and the X-carriage 100 which is riding on the Y-carriage.

The support structures, by permitting easy alignment of the support members without deforming or stressing them, may be inexpensively produced. Precise machining which is very costly is thus eliminated. The unavoidable beam loading deformation of the tubular members and the rail members is kept to an acceptable limit by the size and strength of the material used therein. The present invention is remarkably successful in limiting the dynamic or "in use" stresses and deformations to acceptable valves. Unavoidably, bearing 75 on its swivel mounting will occasionally exert a force during travel of the Y-carriage, tending to separate or bring together tubular member 36 from rail member 40. Since the tubular member 36 is a reference member in machine measurement, it is imperative that its movement or deformation under load be virtually eliminated. To achieve this desirable end, forces exerted by bearings 75, which have a component in a direction parallel to pin member 48, cause the straps or gussets 44 to deform in a direction substantially parallel to pins 48. Thus, rail member 40 is slightly displaced and tubular member 36 is essentially unmoved. A similar situation exists with respect to the X-carriage bearing 136 which may exert a force when in motion which tends to separate or bring together rail member 64 from tubular member 54. As previously explained, forces in a direction parallel to pin members 63 will cause the straps or gussets 60 to deform in a direction parallel to pins 63 and thereby leave tubular member 54 virtually undeformed. When the X-carriage or operational head 100 is moved by a force applied at the probe, the rail member 64 and the straps or gussets 60 will deform slightly, applying a torque to tubular member 54; i.e., in effect the torque introduces some small amount of relative rotation between arm members 57 and 58. A tubular or cylindrical-shaped member is best able on a strength-to-weight ratio to resist such twisting forces without deformation. In addition, the use of the single pin connection in quadrilateral frame 52, joined with the use of gussets 60, allows the frame to be assembled in an untwisted and undeformed state.

In addition, the present invention permits the ready attachment of a Z-carriage device or Z-axis measuring device which is connected relative to the probe and probe holder to measure and record vertical travel.

Although the preceding description and drawings have discussed and shown particular embodiments of the invention in detail, those skilled in the art will recognize that changes may be made in the structure and function of various members without departing from the scope or spirit of the present invention.

The designations of X, Y and Z-carriages are arbitrary and have been made merely for the purposes of description. Naturally, the designations may be interchanged without departing from the scope of the present invention.

We claim:

1. In a coordinate measuring machine the combination of:

a work holding means;

a support means connected to the work holding means having a support tubular member and a support rail member;

support gusset means for fixedly connecting and aligning the support rail member relative to the work holding means;

a movable carriage means having a quadrilateral frame comprised of a carriage tubular member, a carriage rail member and a plurality of arm members fixedly connected to the transverse ends of the carriage tubular member;

first bearing means for slidingly interconnecting said movable carriage means and said support means;

carriage gusset means for fixedly connecting and aligning the carriage rail member relative to the carriage tubular member;

operational head means mounted for movement on the carriage tubular member and carriage rail member;

first and second measuring means for measuring travel in the direction of the support tubular member and the carriage tubular member respectively;

a carriage vernier position adjustment means having a flexible bracket member;

first and second control means journalled through the flexible bracket member;

a first shaft member pivotally interconnecting the flexible bracket member and the movable carriage means to allow said flexible bracket member to pivot with respect to said movable carriage means;

said first control means having a second shaft loosely journalled through the bracket member connected on one end to the movable carriage means and threadedly connected on the other end to a first control knob;

a gripping means connected to the flexible bracket member operative to engage said support rail member; and the second control means being adapted to control the gripping means.

2. In a coordinate measuring machine the combination of:

a work holding means;

a support means connected to the work holding means having a support tubular member and a support rail member;

support gusset means for fixedly connecting and aligning the support rail member relative to the work holding means;

a movable carriage means having a quadrilateral frame comprised of a carriage tubular member, a carriage rail member and a plurality of arm members fixedly connected to the transverse ends of the carriage tubular member;

first bearing means for slidingly interconnecting said movable carriage means and said support means;

carriage gusset means for fixedly connecting and aligning the carriage rail member relative to the carriage tubular member;

operational head means mounted for movement on the carriage tubular member and carriage rail member;

first and second measuring means for measuring travel in the direction of the support tubular member and the carriage tubular member respectively;

an operational head vernier position adjustment means having a flexible bracket member;

first and second control means journalled through the flexible bracket member;

a first shaft member pivotally interconnecting the flexible bracket member and the operational head means to allow said flexible bracket to pivot with respect to said operational head means;

said first control means having a second shaft loosely journalled through said flexible bracket member connected on one end to the operational head means and threadedly connected on the other end to a first control knob;

a gripping means connected to the flexible bracket member operative to engage said carriage rail member; and the second control means being adapted to control the gripping means.

3. In a coordinate measuring machine the combination of:

a work holding means;

a support means connected to the work holding means having a support tubular member and a support rail member;

support gusset means for fixedly connecting and aligning the support rail member relative to the work holding means;

a movable carriage means having a quadrilateral frame comprised of a carriage tubular member, a carriage rail member and a plurality of arm members fixedly connected to the transverse ends of the carriage tubular member;

first bearing means for slidingly interconnecting said movable carriage means and said support means;

carriage gusset means for fixedly connecting and aligning the carriage rail member relative to the carriage tubular member;

operational head means mounted for movement on the carriage tubular member and the carriage rail member;

first and second measuring means for measuring travel in the direction of the support tubular member and the carriage tubular member respectively;

a vernier control means for adjusting the movement of the movable carriage means having a U-shaped bracket member pivotally connected to the movable carriage means;

a gripping means fastened to the bracket member for holding one end of the bracket means relative to the coordinate measuring machine and spaced apart from said pivotal connection;

a threaded shaft member loosely journalled through the bracket member and having one end connected to the movable carriage means;

a first control means threadedly received on the other end of the shaft member to move the bracket member toward the movable carriage means on its pivotal connection;

spring means intermediate the bracket member and the movable carriage means adapted to move the bracket member against the first control means; and second control means for controlling the gripping means.

4. In a coordinate measuring machine the combination of:

a work holding means;

a support means connected to the work holding means having a support tubular member and a support rail member;

support gusset means for fixedly connecting and aligning the support rail member relative to the work holding means;

a movable carriage means having a quadrilateral frame comprised of a carriage tubular member, a carriage rail member and a plurality of arm members fixedly connected to the transverse ends of the carriage tubular member;

first bearing means for slidingly interconnecting said movable carriage means and said support means;

carriage gusset means for fixedly connecting and aligning the carriage rail member relative to the carriage tubular member;

operational head means mounted for movement on the carriage tubular member and carriage rail member;

first and second measuring means for measuring travel in the direction of the support tubular member and the carriage tubular member respectively;

a vernier control means for adjusting the movement of said operational head means having a U-shaped bracket member pivotally connected to the operational head means;

a gripping means fastened to the bracket member for holding one end of the bracket member relative to the coordinate measuring machine and spaced apart from said pivotal connection;

a threaded shaft member loosely journalled through the bracket member and having one end connected to the operational head means;

a first control means threadedly received on the other end of the shaft member to move the bracket member toward the operational head means on its pivotal connection;

spring means intermediate the bracket member and the operational head means adapted to move the bracket member against the first control means; and second control means for controlling the gripping means.

5. The device described in claim 3 wherein:

the first control means include a control wheel threaded on the shaft member; and a plurality of spherically-shaped washer members disposed about the shaft member intermediate of the control wheel and the bracket member.

6. The device described in claim 4 wherein:

the first control means include a control wheel threaded on the shaft member; and a plurality of spherically-shaped washer members disposed about the shaft member intermediate of the control wheel and the bracket member.

References Cited

UNITED STATES PATENTS

| | | | |
|---|---|---|---|
| 2,307,831 | 1/1943 | Emery | 33—147 |
| 2,618,860 | 11/1952 | Engelhart | 33—189 |
| 2,719,364 | 10/1955 | Johnson | 33—189 |
| 2,995,826 | 8/1961 | Brault | 33—189 |
| 3,002,281 | 10/1961 | Stennes | 33—27 |
| 3,067,517 | 12/1962 | Matson | 33—26 |
| 3,161,165 | 12/1964 | Comerio | 308—6 |
| 3,279,073 | 10/1966 | Ardito et al. | 33—79 |
| 3,286,353 | 11/1966 | Potter | 33—174 |
| 3,316,644 | 5/1967 | Baker et al. | 33—79 |

LEONARD FORMAN, *Primary Examiner.*

R. A. FIELDS, *Assistant Examiner.*